(12) United States Patent
Mulet Vallés et al.

(10) Patent No.: US 12,344,485 B2
(45) Date of Patent: Jul. 1, 2025

(54) MACHINE FOR POSITIONING OBJECTS

(71) Applicant: PACKFEEDER S.L.U., Terrassa (ES)

(72) Inventors: Tomás Mulet Vallés, Barcelona (ES); Fernando Martínez Méndez, Barcelona (ES)

(73) Assignee: PackFeeder S.L.U., Terrassa (ES)

( * ) Notice: Subject to any disclaimer, the term of this patent is extended or adjusted under 35 U.S.C. 154(b) by 26 days.

(21) Appl. No.: 18/019,654

(22) PCT Filed: Jun. 21, 2021

(86) PCT No.: PCT/ES2021/070458
§ 371 (c)(1),
(2) Date: Feb. 3, 2023

(87) PCT Pub. No.: WO2022/034249
PCT Pub. Date: Feb. 17, 2022

(65) Prior Publication Data
US 2024/0253910 A1 Aug. 1, 2024

(30) Foreign Application Priority Data
Aug. 12, 2020 (ES) .............................. ES202031821U

(51) Int. Cl.
*B65G 47/252* (2006.01)
*B65G 47/84* (2006.01)
(Continued)

(52) U.S. Cl.
CPC ......... *B65G 47/252* (2013.01); *B65G 47/842* (2013.01); *B65G 47/843* (2013.01);
(Continued)

(58) Field of Classification Search
CPC .. B65G 47/252; B65G 47/842; B65G 47/843; B65G 47/90; B65G 2201/0244; B65G 2201/0252; B65G 2203/0225; B65G 2203/0233; B65G 2203/041; B65G 47/248; B65G 47/1492
See application file for complete search history.

(56) References Cited

U.S. PATENT DOCUMENTS 9,834,392 B2 * 12/2017 Raffaini ................ B65G 47/082
11,186,443 B2 * 11/2021 Boarin ................... B65G 47/28
(Continued)

FOREIGN PATENT DOCUMENTS

WO WO-2019179685 A1 * 9/2019 .............. B25J 9/003

*Primary Examiner* — Mark A Deuble
(74) *Attorney, Agent, or Firm* — Rimon P.C.

(57) ABSTRACT

A machine for positioning objects, comprising a first conveyor belt configured to receive a plurality of objects; computer vision means configured to identify the position and shape of the objects; robotic collection means configured to collect the objects; and exit means configured to allow exiting of the objects. The machine comprises a rotary transfer track arranged in a closed circuit around two rotating axes; and a plurality of transfer elements attached to the rotary transfer track, configured to receive the objects. The rotary transfer track is configured to produce a rotary movement of the transfer elements around the two rotating axes, and a rectilinear movement thereof between the two rotating axes.

22 Claims, 13 Drawing Sheets

(51) Int. Cl.
*B65G 47/86* (2006.01)
*B65G 47/90* (2006.01)

(52) U.S. Cl.
CPC ...... *B65G 47/90* (2013.01); *B65G 2201/0244* (2013.01); *B65G 2201/0252* (2013.01); *B65G 2203/0225* (2013.01)

(56) References Cited

U.S. PATENT DOCUMENTS

| | | | |
|---|---|---|---|
| 11,866,270 B2* | 1/2024 | Bonnain | B65G 47/36 |
| 2008/0283370 A1* | 11/2008 | Monti | B65G 47/256 |
| | | | 198/867.01 |
| 2012/0330457 A1* | 12/2012 | Bourgeois | B65G 47/248 |
| | | | 414/754 |
| 2016/0297619 A1* | 10/2016 | Hahn | B65G 47/846 |
| 2023/0234789 A1* | 7/2023 | Hayashi | B65G 47/68 |
| | | | 198/436 |
| 2023/0391563 A1* | 12/2023 | Dekocker | B65G 54/02 |

* cited by examiner

MACHINE FOR POSITIONING OBJECTS

RELATED APPLICATION

The present application is a national stage application of International Patent Application Serial No. PCT/ES2021/070458, filed on Jun. 21, 2021, which claims priority from ES U202031821 filed on Aug. 12, 2020, the disclosure and content of which is incorporated by reference in its entirety for all purposes.

FIELD OF THE INVENTION

This invention refers to a machine for positioning, by means of robotic manipulation, objects of various shapes and sizes, such as containers, jars, bottles, industrial parts and components, etc., which need to be placed in a certain position, especially in a vertical and/or upright position, for subsequent handling and/or industrial processing, such as packaging, packing, assembling, labeling, coding, blowing, filling, emptying, etc.

BACKGROUND OF THE INVENTION

The use of robotics to position objects is now well-known. The fundamental concept consists of distributing objects in a disorderly (random) manner on a conveyor belt, whose advance makes these objects pass under a machine vision camera so that they are identified in their shape and position. The coordinates of these objects are sent to one or more robots, which dynamically search for these objects in motion, picking them up from the conveyor belt, either by suction or by gripping them, and then transferring them to the delivery area. The objects picked up by the robots are deposited directly on a second conveyor belt in an orderly manner and in a specific position. Said second conveyor belt facilitates their output from the machine to lead them to the next process. Document WO2014/064593A1 shows an example of such machines and procedures for positioning objects.

From a technical point of view, in all existing robotic applications in the field of object positioning there are two fundamental factors to consider.

The first one is related to the maximum transfer speed of the objects from the robot to the output conveyor belt. In particular, this transfer speed is considerably reduced due to the risk of objects falling when they are deposited on the output conveyor belt, especially if they are light and/or unstable, as is often the case with lightweight elongated containers, such as plastic bottles. That is to say, no matter how fast the robot is, at the end, in the process of delivery to the conveyor belt, it cannot simply release the object, but it has to accompany it for a while on the conveyor belt until it reaches the same speed, so that when the object is released it does not produce inertias that unbalance the object causing it to fall.

The second factor relates to the space occupied by robotic applications per unit produced per unit of time. In particular, the space occupied can be quite considerable, constituting an important limitation when its implementation is required in facilities with limited surface area.

Document WO2019/179685A1 shows a machine for positioning objects that optimizes both factors of speed and space previously discussed in robotic applications, thanks to an efficient and compact technical solution that allows the maximum transfer speed to increase, requiring less space, and for a greater diversity of objects. Said machine comprises a first conveyor belt set to receive a plurality of objects, machine vision means to identify the position and shape of the objects arranged on the first conveyor belt, robotic collection means set to pick up the objects from the first conveyor belt according to the information received from the machine vision means, a second conveyor belt or output belt set to allow the output of said objects, and a transfer track set to receive the objects coming from the robotic collection means and deliver said objects to the second conveyor belt.

Despite being a highly reliable and sophisticated solution, the transfer track configuration has limitations in terms of the possibility to accommodate other operations or processes, such as assembly, filling, closing, etc., before releasing the objects onto the output conveyor belt.

The machine for positioning objects of this invention solves the abovementioned problems by means of a transfer track configuration which, in addition to optimizing the speed and space factors of robotic applications, allows other operations or processes to be performed before releasing the objects onto the output conveyor belt. Said configuration is also very simple and efficient.

DESCRIPTION OF THE INVENTION

The machine for positioning objects of this invention comprises:
 a first motorized conveyor or conveyor belt set to receive a plurality of objects;
 machine vision means set to identify the position and shape of objects placed on the first conveyor belt, for example, by employing one or more machine vision cameras;
 robotic collection means set to pick up the objects from the first conveyor belt according to the information received from the machine vision means, for example, by using one or more "delta" type robot arms; and
 output means set to allow the output of such objects.

Generally, the arrangement of objects on the first conveyor belt is random, especially when handling plastic containers or other light objects. However, the objects can also be arranged on the first conveyor belt in an orderly manner, e.g., supplied on object trays, as is often the case for glass or other fragile objects.

Likewise, the collection of objects by robotic means of collection is generally selective, i.e., based on certain conditions. For example; picking objects that are closer to the robotic picking means; picking only objects that arrive in a certain orientation and/or position, or have certain characteristics; picking objects that are easier to deliver to the first conveyor belt, etc.

The machine for positioning objects of this invention is characterized in that it comprises:
 a rotating transfer track arranged in a closed circuit around two rotating axes; and
 a plurality of transfer elements attached to the rotating transfer track along the rotating transfer track, set to receive objects coming from the robotic collection means and deliver such objects to the output means.

Said rotating transfer track is set to produce a rotary movement of the transfer elements around the two rotating axes, and a rectilinear movement of them between said two rotating axes. The transfer elements are therefore pulled by the movement of the rotating transfer track since they are attached thereto.

The rotary movement of the transfer elements, once they transport the objects, causes a change in orientation and/or position of the objects from a predetermined pick-up position to a final delivery position. Thus, by means of a 180° rotation of the transfer elements, they actively contribute to the positioning and/or change of orientation of the objects, saving movements to the robotic collection means and thus increasing transfer speed.

On the other hand, the rectilinear movement of the transfer elements allows other operations or processes to be conducted, such as assembly, filling, closing, etc., before releasing the objects. Thus, these operations can be performed on the same transfer track while the objects are being transported by the transfer elements. The length and path of the transfer track are adapted to accommodate the various intermediate operations of the objects before releasing the objects.

The rectilinear movement of the transfer elements is also considered a translational movement, in the sense that during this movement there is a change in the position of the transfer elements but not in their orientation, as is the case when the transfer elements rotate.

The output means can adopt different constructive configurations to facilitate both the output of objects and their handling before they are released by the transfer elements.

Preferably, such configurations allow the objects to be supported on the output means, while maintaining their hold by the transfer elements. This is because many of these operations involve a greater clamping effort on the part of the transfer elements. For example, the filling of a container involves a greater weight of the clamped container, or the addition of a cap or label involves additional force or pressure on the container. Thus, by allowing the objects to be supported on the outlet means, the clamping effort on the part of the transfer elements is reduced, avoiding excessive overloads on the transfer elements and/or the accidental detachment of the objects due to the additional efforts involved in such operations or processes.

According to a first preferred embodiment, the output means comprise a handling track arranged longitudinally according to a direction of advance of the objects, set to allow the support and sliding of the objects along the handling track when they are held by the transfer elements. Preferably, said handling track is arranged parallel to the first conveyor belt, at a lower height with respect thereto. The length and path of the handling track are adapted to accommodate the various intermediate operations of the objects before releasing them.

Thus, said handling track, also called sliding track, makes it possible to hold the object by its base and at the same time avoids excessive friction of the handling track, so that it preferably features a contact surface and/or sliding means favoring said function.

According to a first configuration of the handling track, it is formed by a plurality of smooth-surfaced rods. Said rods are arranged longitudinally in parallel as a guide, leaving free spaces between them to reduce the friction of the objects.

According to a second configuration of the handling track, it is formed as a plate or sheet. Said plate or sheet is arranged longitudinally, comprising a grid-like pattern of holes and/or recesses to reduce the friction of the objects.

According to a third configuration of the handling track, it is formed by a plurality of rotating rollers arranged perpendicular to the direction of advance of the objects. The rollers are set to rotate freely by the action of the objects themselves contacting the rollers to reduce friction.

In the above cases, the presence of a minimum contact surface with the object with free spaces, holes, and/or gaps, allows to act on the base of the container, for example, to apply a batch code. Likewise, if any incident occurs during the filling of the container, this can facilitate the evacuation of the spilled product, as well as its cleaning, preventing the product from spreading along the line.

According to a second preferred embodiment, the output means comprise a second motorized conveyor or conveyor belt. The length and path of the second conveyor belt are adapted to accommodate the various intermediate operations of the objects before releasing the objects. Said second conveyor belt can be very useful, for example, in the capping process, where a certain pressure is exerted on the bottle, synchronizing the movement of the bottle with the transfer elements.

The machine for positioning objects of this invention may integrate one or both configurations of the output means in one and the same embodiment. That is to say, it can have either a handling track, or a second conveyor belt, or both at the same time conveniently arranged to work collaboratively. In the latter case, the handling lane can be arranged first, followed by the second conveyor belt to receive the objects coming from the handling lane.

Preferably, the machine comprises a handling section as a consequence of the longitudinal extension of the rotating transfer track, in which the rectilinear travel of the transfer elements is increased so that they can be handled more easily. Preferably, said handling section protrudes laterally from the machine in order to be able to arrange around it the equipment and/or workstations necessary to conduct other operations or processes, such as assembly, filling, closing, etc., before releasing the objects.

Preferably, the rotating transfer track is of the carousel, transfer conveyor or conveyor belt type, which defines a closed oval-shaped path composed of two parallel straight segments joined by two arcs or semicircles. The axes of rotation pass through the center of said arcs or semicircles.

According to a preferred embodiment, the rotating transfer track is formed by a motorized rotating conveyor belt.

Preferably, said rotating conveyor belt comprises:
two semicircular sections arranged around the two rotating axes, each set to produce the rotary movement of the transfer elements; and
two straight sections attached to both semicircular sections between the two rotating axes, each set to produce the rectilinear movement of the transfer elements.

The semicircular and straight sections are joined together to form a closed circuit.

On the other hand, the rotating transfer track can be mounted and/or positioned in different ways with respect to the first conveyor belt and the output means. Said mounting and/or positioning arrangements have an influence on the space occupied by the machine, the compactness of the machine, and the accessibility of its components, as well as on the process of positioning and/or change of orientation of the objects.

According to a first mounting and/or positioning arrangement, the rotating transfer track is arranged in an inclined position between the first conveyor belt and the output means. In this case, the transfer elements are set to receive the objects coming from the robotic collection means in a horizontal position and deliver these objects to the output means in a vertical position. This first arrangement is very compact and offers great accessibility to the main components of the machine.

According to a second mounting and/or positioning arrangement, the rotating transfer track is arranged vertically between the first conveyor belt and the output means. In this case, the transfer elements are set to receive the objects coming from the robotic collection means in an inverted vertical position and deliver these objects to the output means in a vertical position. This second arrangement means that the machine takes up less space. At the same time, the inverted vertical pick-up position is ideal for the application of blowing and/or emptying processes of the containers, normally focused on cleaning them.

According to a third mounting and/or positioning arrangement, the rotating transfer track is arranged horizontally between the first conveyor belt and the output means. In this case, the transfer elements are set to receive the objects coming from the robotic collection means in a vertical position and deliver these objects to the output means in a vertical position. In this third arrangement, the main components of the machine are at a fairly accessible height, and the number of operations required to conduct the delivery to the output means is reduced, since the objects can be picked up and delivered in the same position, with a change of orientation of the objects.

In all three of the above cases, it is consistent that the objects are rotated 180° from the pick-up position to the delivery position. This actively contributes to the positioning and/or change of orientation of the objects, saving movements to the robotic picking means and thus increasing transfer speed.

The transfer elements are set to receive the objects coming from the robotic picking means in a predetermined position and deliver these objects to the output means in an upright position, i.e., upright or resting on their main support base. However, in other cases of application, the delivery position can be horizontal or any other stable position of the object that allows its output in an orderly manner (e.g., resting on a flat face of the object other than the support base).

The transfer elements are set to transport and/or clamp the objects by pneumatic suction or mechanical clamping.

According to a case of pneumatic gripping of the objects, preferably, each transfer element is formed by a head comprising one or more suction cups set to grip the object by suction and/or suction thereof.

The number and arrangement of the suction cups, as well as the dimensions of the head, are adapted to the shape and/or size of the objects to be positioned. In the case of elongated objects of the bottle type, preferably the head comprises at least two suction cups arranged perpendicular to the direction of advance of the objects. So that when the suction cups grip the object, the object is also arranged perpendicular to its direction of travel.

The position of the suction cups with respect to the head the head is preferably adjustable, in order to adapt the head to a greater diversity of objects to be positioned. For this purpose, preferably, each suction cup is arranged on a sliding base set to vary the position of the suction cup on the head. This makes it possible, for example, to vary the distance between two suction cups to adapt it to the length and/or height of the object, favoring its correct gripping.

The suction cup gripping system includes the pneumatic circuit and all the control elements necessary to create the vacuum in the suction cups and/or the suction of the objects during their reception, and to release them during their delivery once the objects have been positioned and/or the necessary operations have been performed on them.

The gripping of objects by means of suction cups offers the advantage that it is not necessary to have space for opening and closing the transfer elements, allowing a smaller distance between heads and consequently a lower displacement speed for a same positioning rate.

According to a case of mechanical gripping of objects, each transfer element is formed by a gripper set to grip the object.

Preferably, the gripper is set to close after receipt of the object to clamp it, and to open during delivery of said object to release it. To this end, the gripper is preferably formed by a static gripper portion solidly attached to the rotatable transfer track, and a dynamic gripper portion articulated to said static gripper portion, set to open or close the gripper by interacting with mechanical actuators arranged around the rotatable transfer track. For example, one or more cams in fixed position distributed around the transfer track, set to contact the dynamic gripper portion upon passage of the transfer element and cause articulation thereof to the static gripper portion. Said rotation allows the gripper to be opened to pick up or deliver the object and closed to hold it.

Preferably, the gripper forms an angle of inclination with respect to the rotating transfer track, for example, of 45° or 135°, depending on the inclination thereof, so as to be arranged vertically in a pick-up position, and horizontally in a delivery position.

The machine for positioning objects of this invention can have its own or external means of supplying the objects to be positioned. That is to say, the objects can reach the first conveyor belt from a containment or storage area integrated in the machine itself, or from an external location.

For greater compactness, versatility, and autonomy of the machine, it preferably has its own means of supplying the objects to be positioned. In particular, the machine comprises a supply hopper set to hold the objects randomly, and an elevator set to pick up the objects from the supply hopper and arrange them on a first end of the first conveyor belt.

Likewise, as previously mentioned, the collection of objects by robotic collection means can be selective, that is, of those objects that meet certain conditions. Thus, the remaining objects must return to the process line and/or to the supply means. For this purpose, preferably, the machine comprises a return lane adjacent to a second end of the first conveyor belt, set to receive the objects arriving at said second end and return them by gravity to the supply hopper.

Finally, the objects can be released directly onto the outlet means, or indirectly. In the latter case, by depositing them on support bases, for example "pucks," which offer greater stability to the objects once released, which allows the speed of delivery of the objects to increase and, therefore, the number of objects positioned per unit of time to increase.

BRIEF DESCRIPTION OF THE DRAWINGS

The following is a very brief description of a series of drawings which help to better understand the invention and which relate expressly to various embodiments of said invention which are presented as non-limiting examples thereof.

DETAILED DESCRIPTION OF THE INVENTION

FIGS. 1 to 8 show a first embodiment of the machine (1) for positioning objects of this invention, in which the objects (O) are conveyed by means of pneumatic suction.

Figure 1:
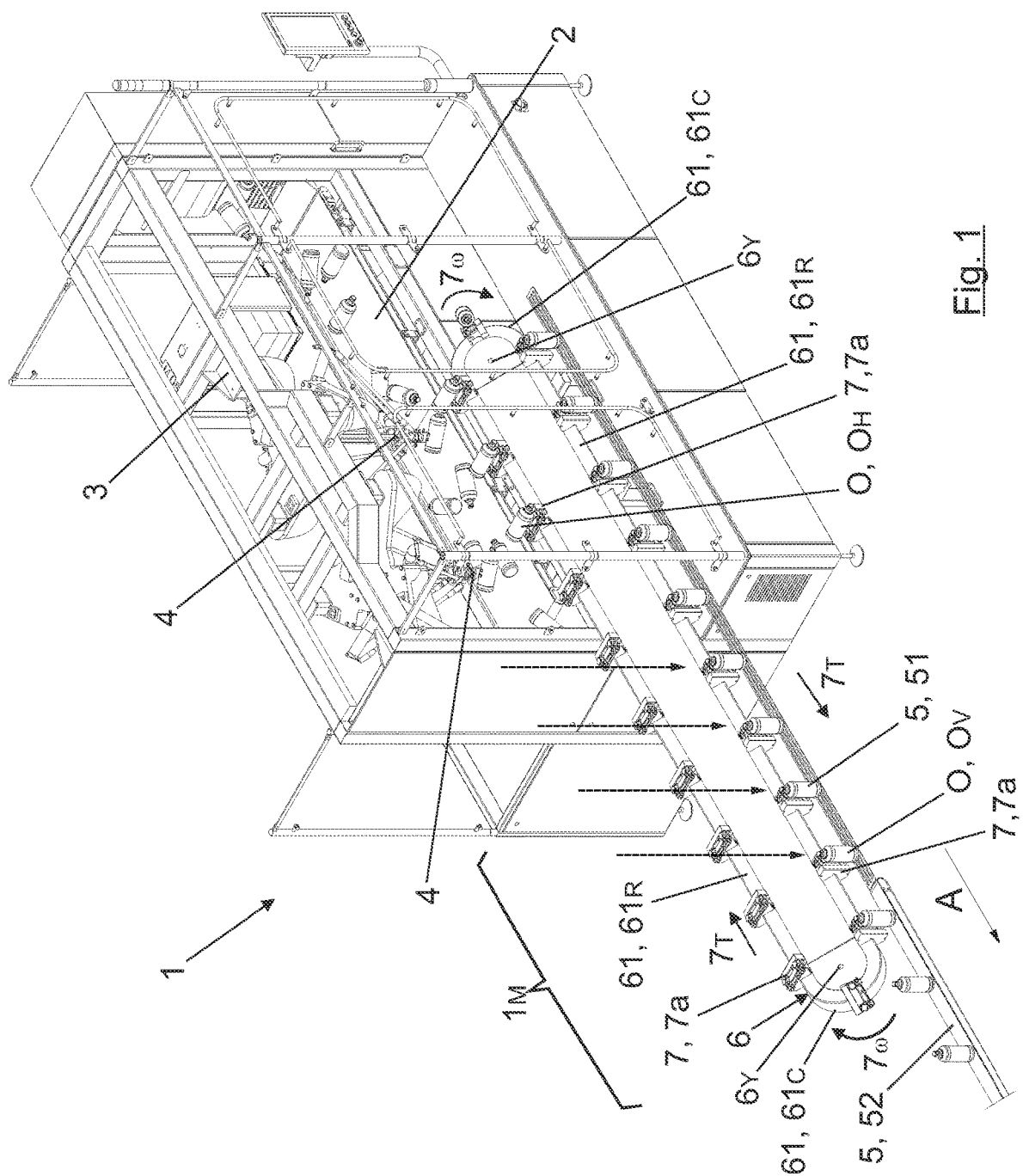
FIG. 1 depicts a general perspective view of the machine of this invention, according to a first preferred embodiment.
Figure 2:
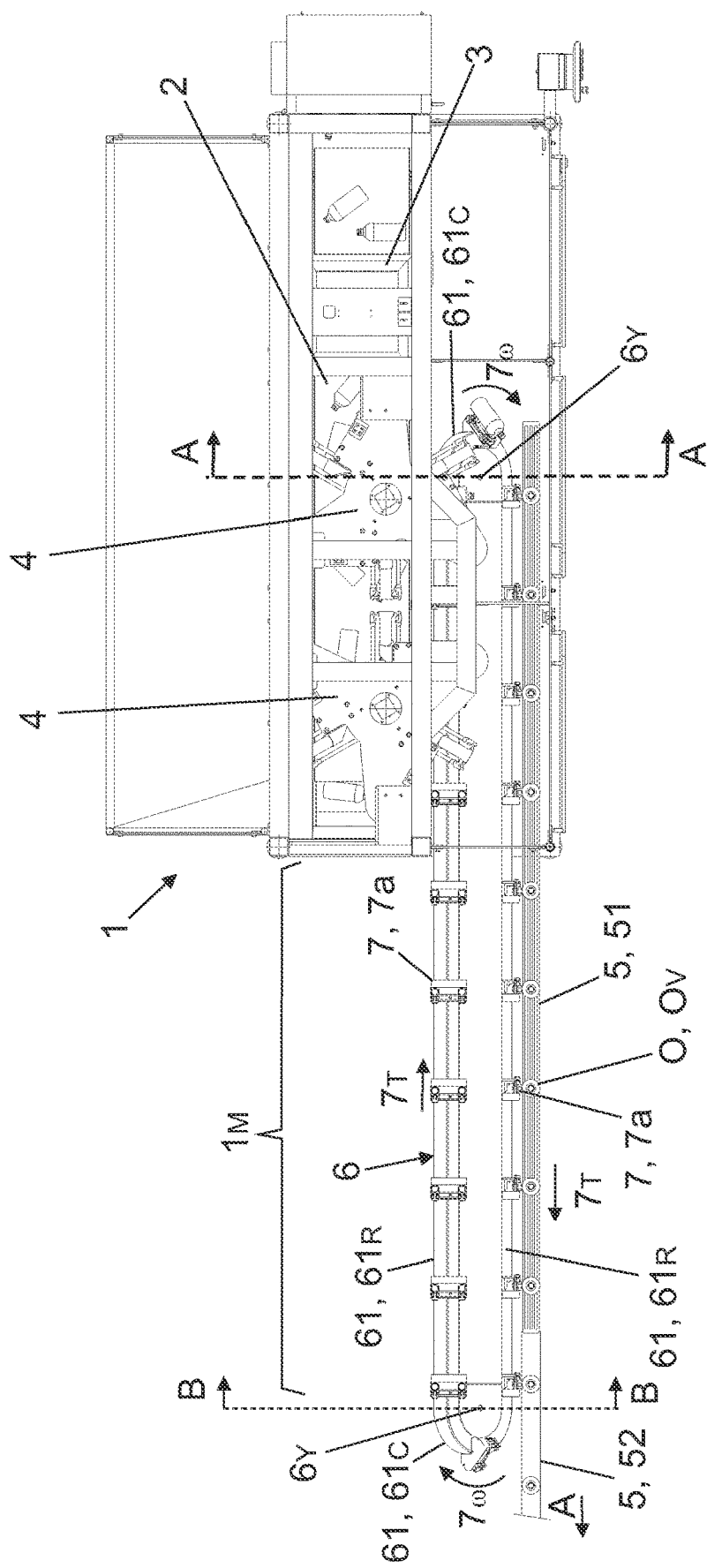
FIG. 2 depicts a plan view of the machine in FIG. 1.

As can be seen in FIGS. 1 and 2, the machine (1) comprises:
- a first conveyor belt (2) set to receive a plurality of objects (O);
- machine vision means (3) set to identify the position and shape of objects (O) arranged on the first conveyor belt (2), in this case, by using a machine vision camera;
- robotic collection means (4) set to pick up the objects (O) from the first conveyor belt (2) according to the information received from the machine vision means (3), in this case, by using two "delta" type robot arms; and
- output means (5) set to allow the output of said objects (O).

The machine (1) is characterized in that it comprises:
- a rotating transfer track (6) arranged in a closed circuit around rotating axes ($6_Y$); and
- a plurality of transfer elements (7, 7a) attached to the rotating transfer track (6) along it, set to receive the objects (O) coming from the robotic collection means (4) and deliver said objects (O) to the output means (5).

Said rotating transfer track (6) is set to produce a rotary movement ($7\omega$) of the transfer elements (7, 7a) around the two rotating axes ($6_Y$), and a rectilinear movement ($7_T$) thereof between said two rotating axes ($6_Y$).

The rotary movement ($7\omega$) of the transfer elements (7, 7a), once they transport the objects (O), causes a change of orientation and/or position of said objects (O) from a predetermined pick-up position to a final delivery position. Thus, by means of a 180° rotation of the transfer elements (7, 7a), they actively contribute to the positioning and/or change of orientation of the objects (O), saving movements to the robotic collection means (4) and thus increasing transfer speed.

On the other hand, the rectilinear movement ($7_T$) of the transfer elements (7, 7a), allows other operations or processes to be conducted, such as assembly, filling, closing, etc., before releasing the objects (O). Thus, these operations can be performed on the same transfer track (6) while the objects (O) are being transported by the transfer elements (7, 7a). The length and path of the transfer track (6) are adapted to accommodate the various intermediate operations of the objects (O) before releasing the objects.

The output means (5) comprise a handling track (51) arranged longitudinally according to a direction of advance (A) of the objects (O), set to allow the support and sliding (O) of the objects along the handling track when they are held by the transfer elements (7, 7a). Said handling track (51) is arranged parallel to the first conveyor belt (2), at a lower height with respect thereto. The length and travel of the handling track (51) are adapted to accommodate the various intermediate operations of the objects (O) before releasing them.

According to this example, the machine (1) for positioning objects also integrates a second conveyor belt (52) arranged downstream the track of the handling track (51) to work collaboratively, receiving the objects (O) coming from said handling track (51).

The machine (1) comprises a handling section ($1_M$) as a result of the longitudinal extension of the rotating transfer track (6), in which the rectilinear travel of the transfer elements (7, 7a) is increased so that they can be handled more easily. Said handling section ($1_M$) protrudes laterally from the machine (1) in order to be able to arrange around it the equipment and/or workstations necessary to conduct other operations or processes, such as assembly, filling, closing, etc., before releasing the objects (O).

The rotating transfer track is (6) of the carousel, transfer conveyor or conveyor belt type, which defines a closed oval-shaped path composed of two parallel straight segments joined by two arcs or semicircles. The axes of rotation ($6_Y$) pass through the center of said arcs or semicircles.

The rotating transfer track (6) is formed by a rotating conveyor belt (61) comprising:
- two semicircular sections ($61_C$) arranged around the two rotating axes ($6_Y$), each set to produce the rotary movement ($7\omega$) of the transfer elements (7, 7a); and
- two straight sections ($61_R$) attached to both semicircular sections ($61_C$) between the two rotating axes ($6_Y$), each set to produce the rectilinear movement ($7_T$) of the transfer elements (7, 7a).

The semicircular ($61_C$) and straight sections ($61_R$) are joined together to form a closed circuit.

Figure 3:
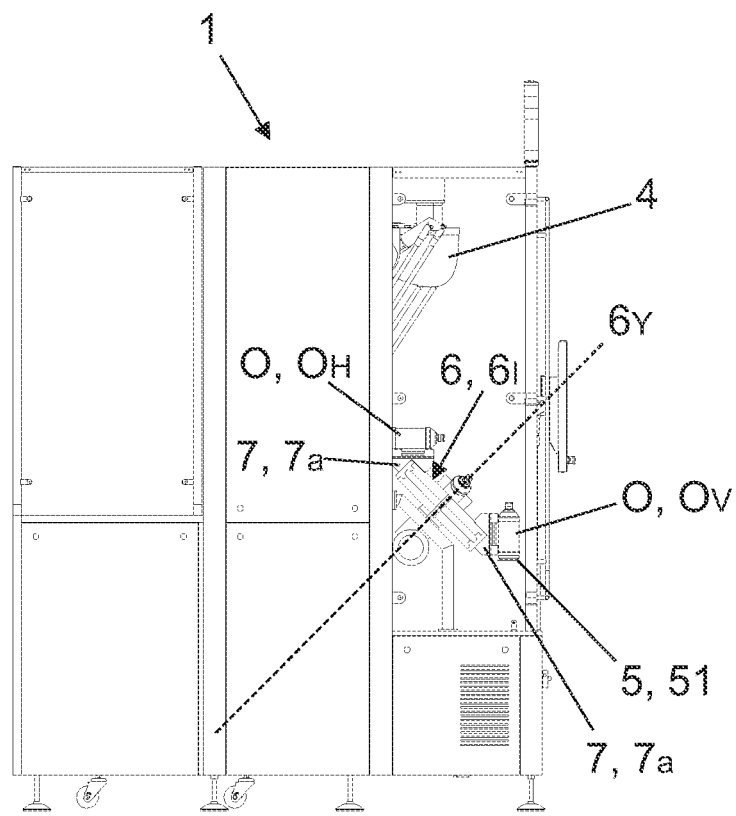
FIG. 3 depicts a profile view of the machine in FIG. 1.

As shown in FIG. 3, the rotating transfer track (6) is arranged in an inclined position ($6_I$) between the first conveyor belt (2) and the output means (5). In this case, the transfer elements (7, 7a) are set to receive the objects (O) coming from the robotic collection means (4) in a horizontal position ($O_H$) and deliver said objects (O) to the output means (5) in a vertical position ($O_V$).

Figure 4:
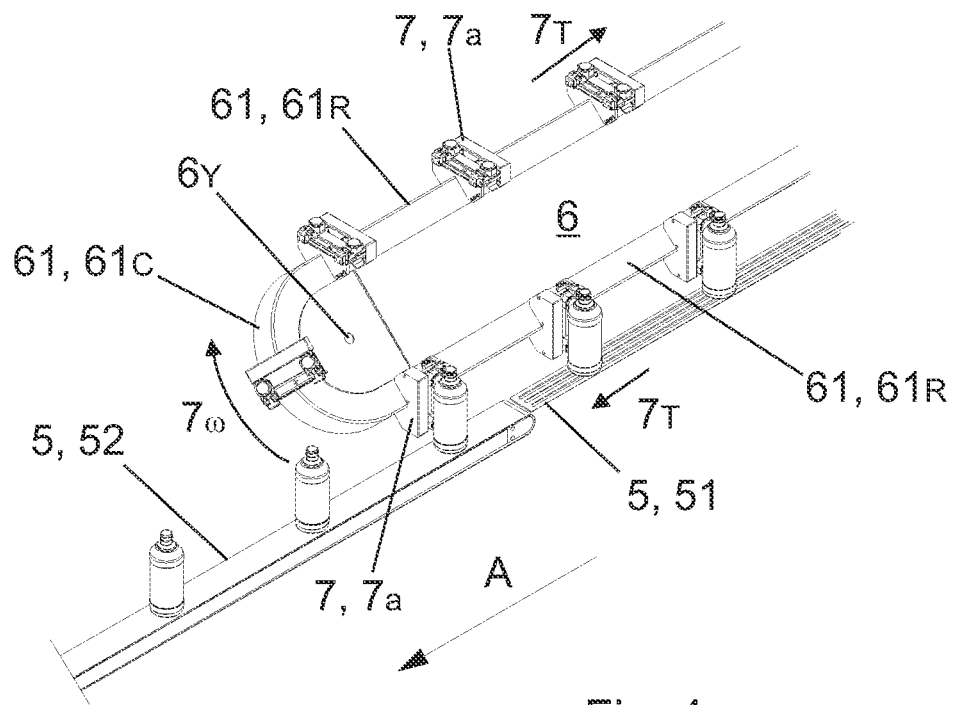
FIG. 4 represents a detail view of one end of the rotary transfer track of the machine of FIG. 1.

FIG. 4 shows in more detail the arrangement of the transfer elements (7, 7a) in relation to the rotating transfer track (6). Specifically, said transfer elements (7, 7a) are attached to the rotatable transfer track (6), spaced equidistantly therebetween, or as appropriate, along the rotatable transfer track (6). The transfer elements (7, 7a) are therefore moved by the movement of the rotating transfer track (6) since they are attached thereto.

Figure 5:
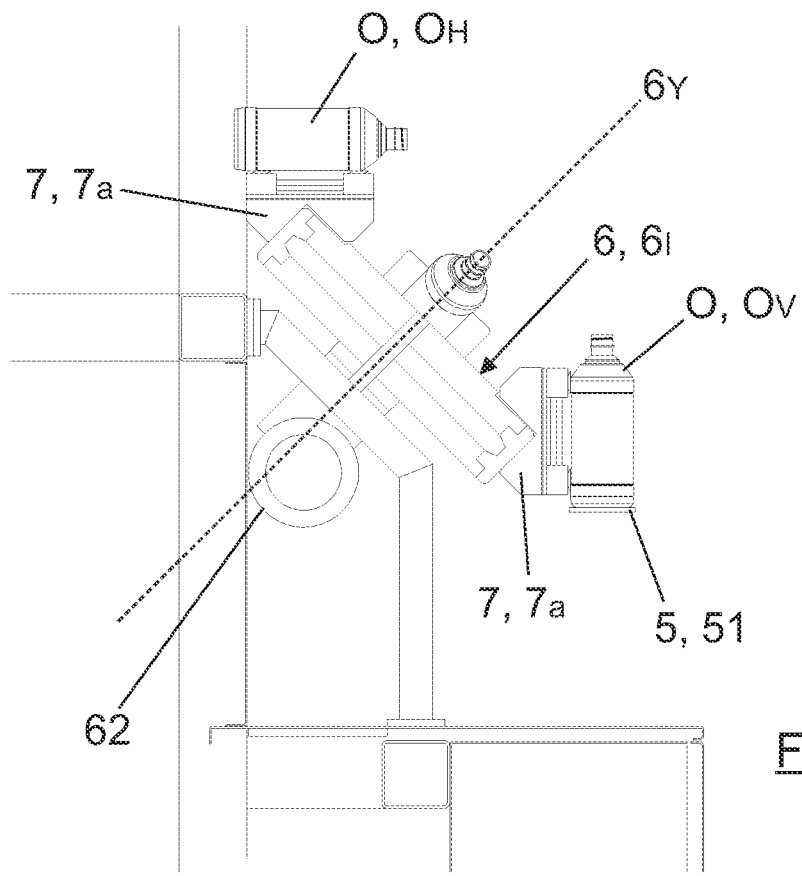
FIG. 5 depicts a partial sectional view according to cutline A-A of FIG. 2.

FIG. 5 shows a cross-section of the rotary transfer track (6) through one of its two rotating axes ($6_Y$), in this case, a transmitter rotation axis ($6_Y$) that receives the movement of a motor (62) and transmits it to the rotating conveyor belt (61) on which the transfer elements (7, 7a) are attached.

Figure 6:
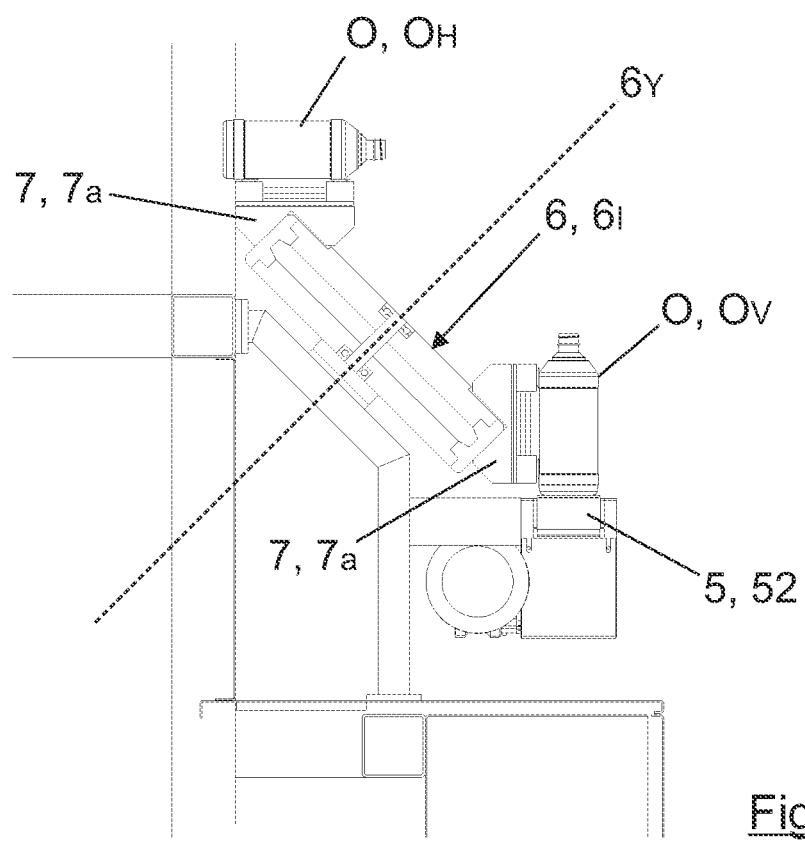
FIG. 6 depicts a partial sectional view according to cutline B-B of FIG. 2.

FIG. 6 shows a cross-section of the rotating transfer track (6) through the other of its two rotating axes ($6_Y$), in this case, a driven rotation axis ($6_Y$) that rotates freely dragged by the movement of the rotating conveyor belt (61).

Figure 7:
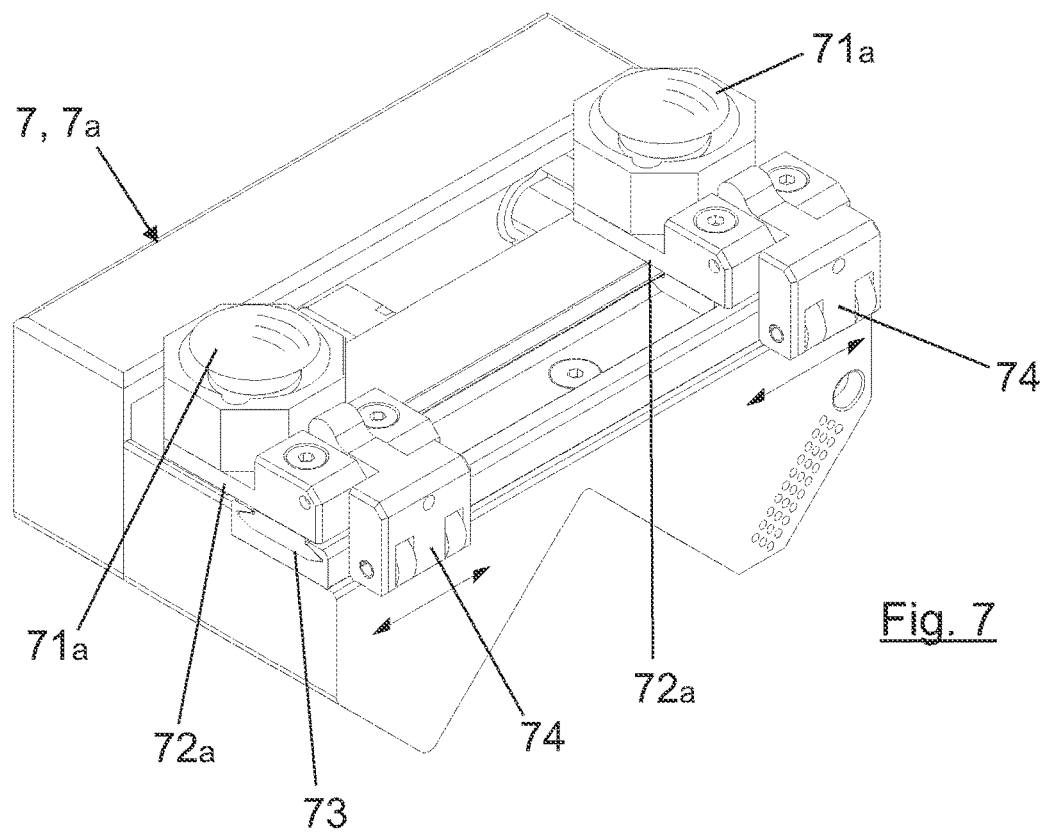
FIG. 7 depicts a perspective view of a suction head of the rotating transfer track of FIGS. 1 to 6.
Figure 8:
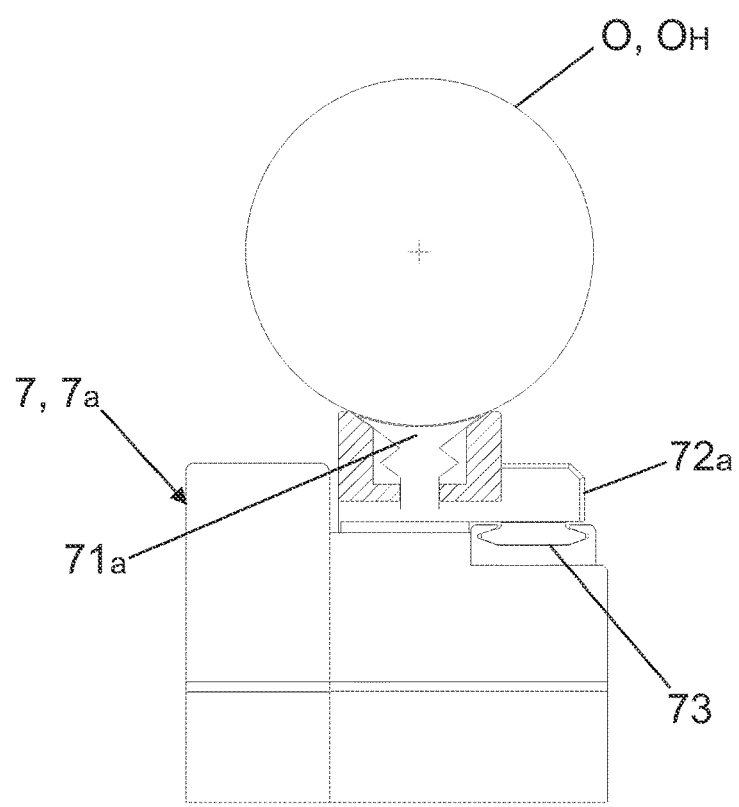
FIG. 8 depicts a cross-section of the suction head in FIG. 7.

As can be seen in FIGS. 7 and 8, each transfer element (7) is formed by a head (7a) comprising two suction cups (71a) set to hold the object (O) by suction and/or aspiration thereof. The two suction cups (71a) are arranged perpendicular to the forward direction (A) of the objects (O). So that when the suction cups (71a) grip the object (O), the object is also arranged perpendicular to its direction of travel (A), FIG. 1.

The position of the suction cups (71a) with respect to the head the head (7a) is adjustable, in order to adapt the head to a greater diversity of objects (O) to be positioned. For this purpose, each suction cup (71a) is arranged on a sliding base (72a) set to vary the position of the suction cup (71a) on the head (7a). The sliding bases (72a) can slide along a guide rail (73) after release of the brake (74) associated with each sliding base (72a). This makes it possible, for example, to vary the distance between two suction cups (71a) to adapt it to the length and/or height of the object (O), encouraging its correct gripping.

Figure 9:
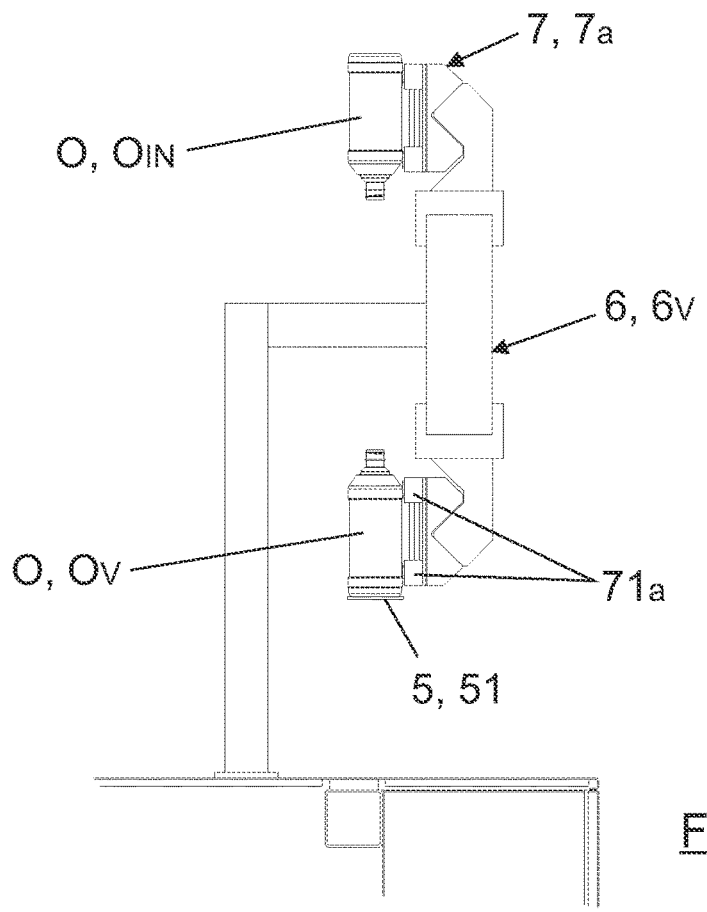
FIG. 9 represents a partial profile view of a first embodiment variant of the machine of FIG. 1, in which the rotating transfer track is arranged vertically.

FIG. 9 shows a first embodiment of the machine of FIG. 1, in which the rotating transfer track (6) is arranged vertically ($6_V$) between the first conveyor belt (2) and the output means (5). In this case, the transfer elements (7, 7a) are set to receive the objects (O) coming from the robotic collection means (4) in inverted vertical position ($O_{IN}$) and deliver said objects (O) to the output means (5) in vertical position ($O_V$).

Figure 10:
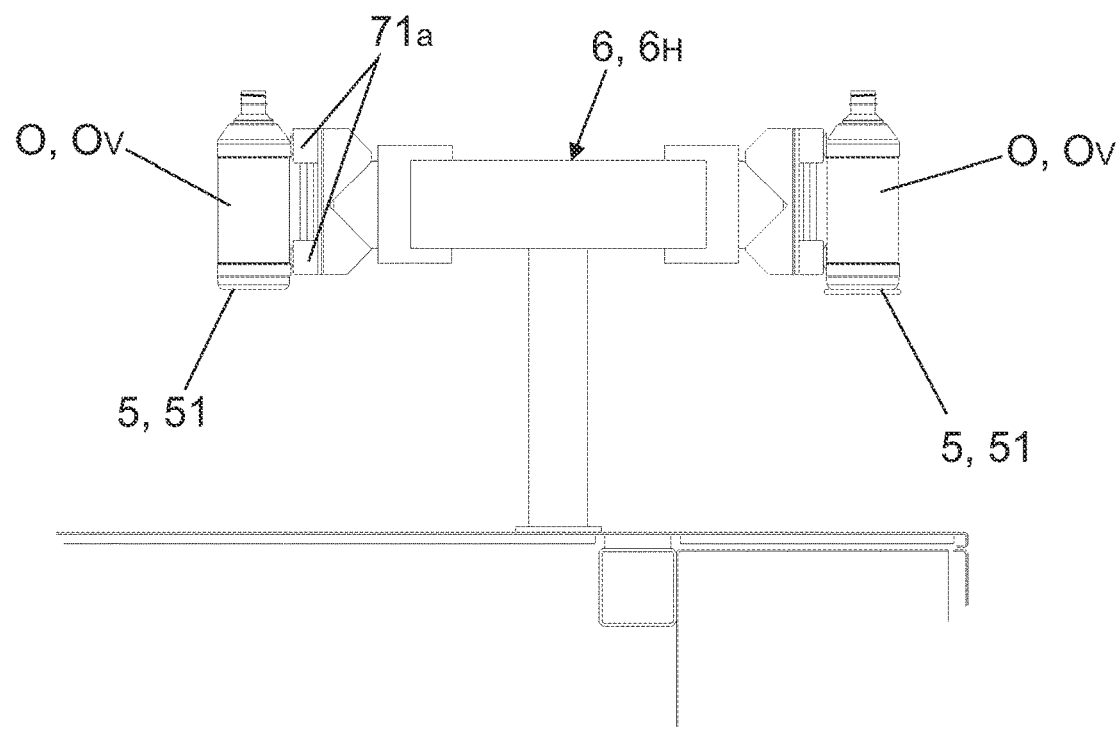
FIG. 10 depicts a partial profile view of a second embodiment of the machine of FIG. 1, in which the rotating transfer track is arranged horizontally.

FIG. 10 shows a second embodiment of the machine of FIG. 1, in which the rotating transfer track (6) is arranged horizontally ($6_H$) between the first conveyor belt (2) and the output means (5). In this case, the transfer elements (7, 7a) are set to receive the objects (O) coming from the robotic collection means (4) in a vertical position ($O_V$) and deliver said objects (O) to the output means (5) in a vertical position ($O_V$).

FIGS. 11 to 16 show a second embodiment of the machine (1) for positioning objects of this invention, in which the objects (O) are transported by means of mechanical clamp-type gripping.

Figure 11:
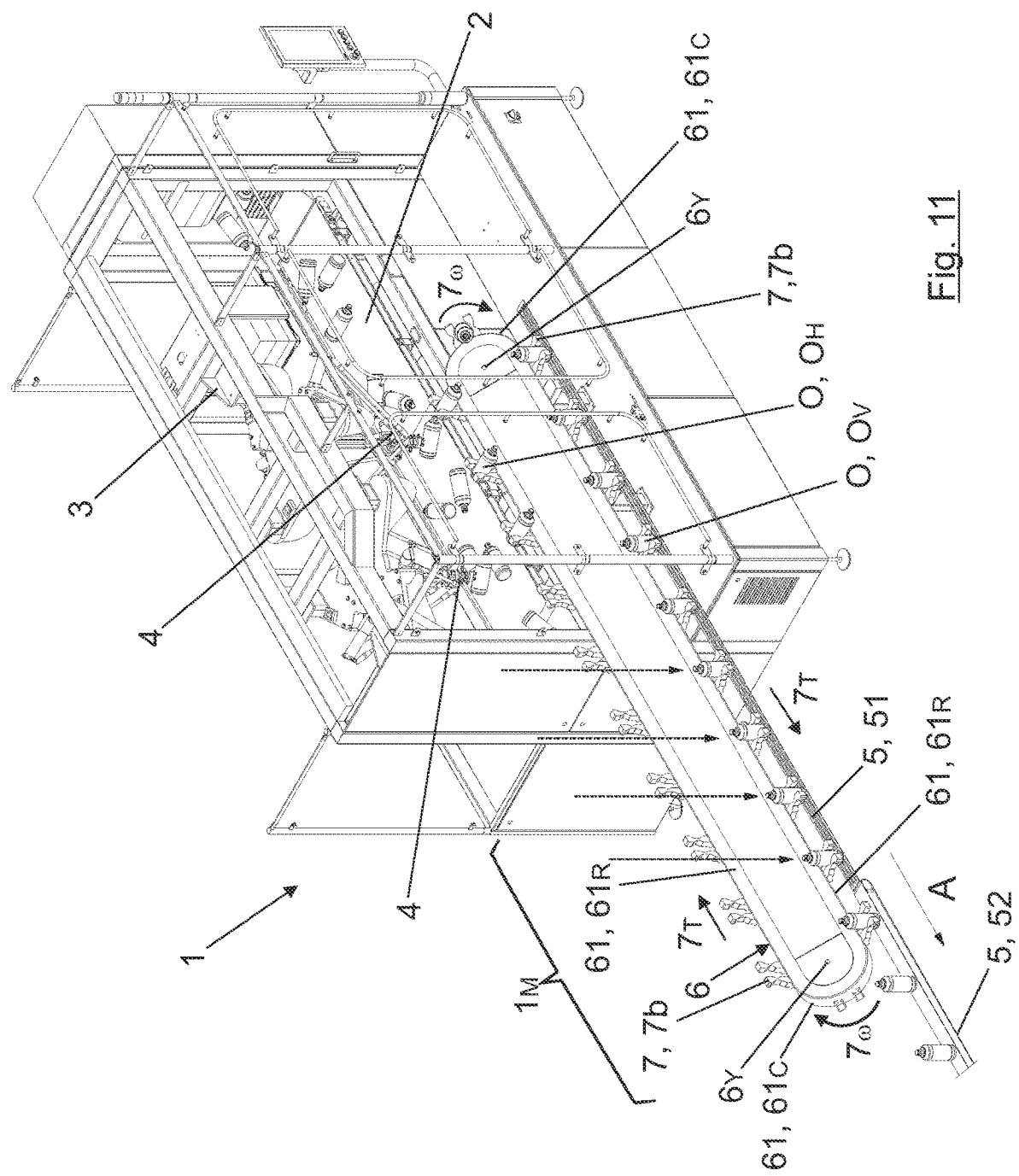
FIG. 11 depicts a general perspective view of the machine of this invention, according to a second preferred embodiment.
Figure 12:
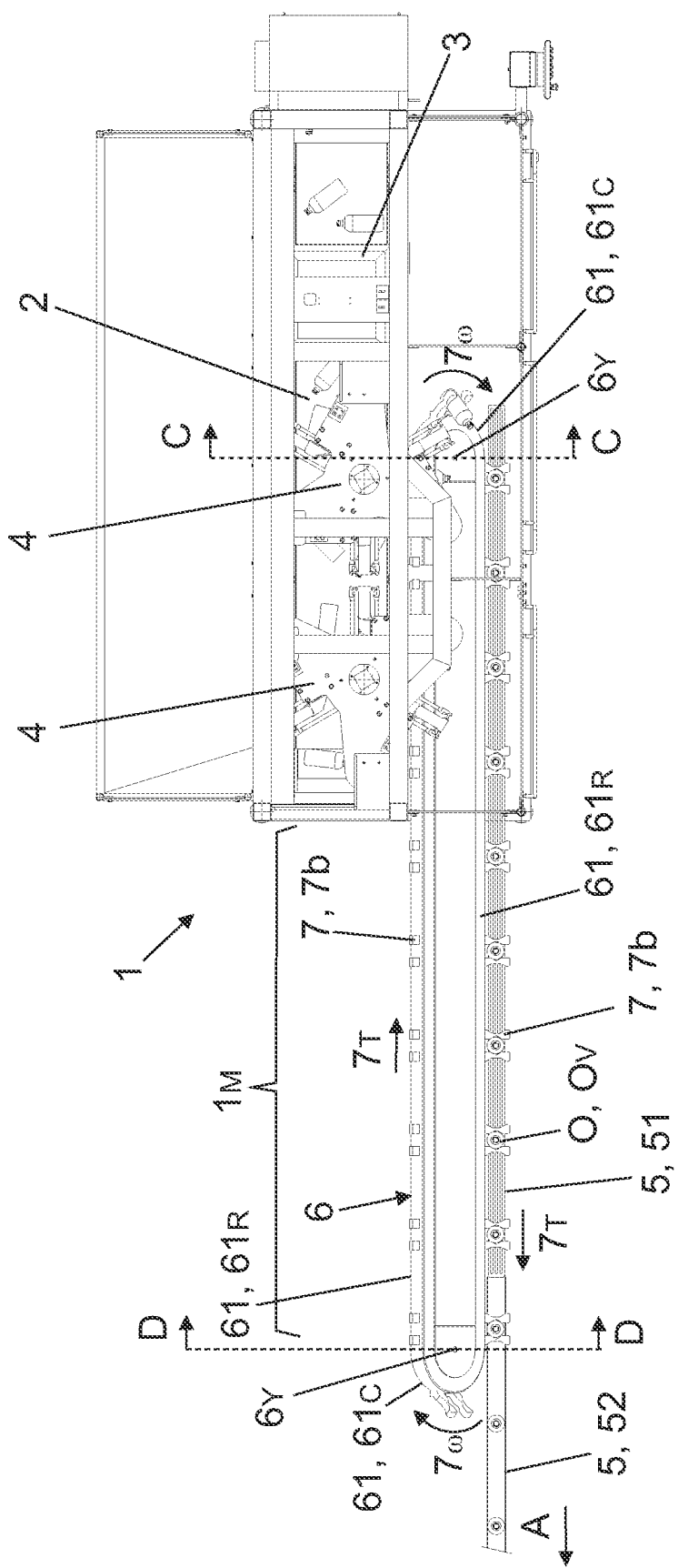
FIG. 12 depicts a plan view of the machine in FIG. 11.

As can be seen in FIGS. 11 and 12, the machine (1) comprises:
 a first conveyor belt (2) set to receive a plurality of objects (O);
 machine vision means (3) set to identify the position and shape of objects (O) arranged on the first conveyor belt (2), in this case, by using a machine vision camera;
 robotic collection means (4) set to pick up the objects (O) from the first conveyor belt (2) according to the information received from the machine vision means (3), in this case, by using two "delta" type robot arms; and
 output means (5) set to allow the output of said objects (O).

The machine (1) is characterized in that it comprises:
 a rotating transfer track (6) arranged in a closed circuit around rotating axes ($6_Y$); and
 a plurality of transfer elements (7, 7b) attached to the rotating transfer track (6) along it, set to receive the objects (O) coming from the robotic collection means (4) and deliver said objects (O) to the output means (5).

Said rotating transfer track (6) is set to produce a rotary movement ($7\omega$) of the transfer elements (7, 7b) around the two rotating axes ($6_Y$), and a rectilinear movement ($7_T$) thereof between said two rotating axes ($6_Y$).

The rotary movement ($7\omega$) of the transfer elements (7, 7b), once they transport the objects (O), causes a change of orientation and/or position of said objects (O) from a predetermined pick-up position to a final delivery position. Thus, by means of a 180° rotation of the transfer elements (7, 7b), they actively contribute to the positioning and/or change of orientation of the objects (O), saving movements to the robotic collection means (4) and thus increasing transfer speed.

On the other hand, the rectilinear movement ($7_T$) of the transfer elements (7, 7b), allows other operations or processes to be conducted, such as assembly, filling, closing, etc., before releasing the objects (O). Thus, these operations can be performed on the same transfer track (6) while the objects (O) are being transported by the transfer elements (7, 7b). The length and path of the transfer track (6) are adapted to accommodate the various intermediate operations of the objects (O) before releasing the objects.

The output means (5) comprise a handling track (51) arranged longitudinally according to a direction of advance (A) of the objects (O), set to allow the support and sliding (O) of the objects along the handling track when they are held by the transfer elements (7, 7b). Said handling track (51) is arranged parallel to the first conveyor belt (2), at a lower height with respect thereto. The length and travel of the handling track (51) are adapted to accommodate the various intermediate operations of the objects (O) before releasing them.

According to this example, the machine (1) for positioning objects also integrates a second conveyor belt (52) arranged downstream the track of the handling track (51) to work collaboratively, receiving the objects (O) coming from said handling track (51).

The machine (1) comprises a handling section ($1_M$) as a result of the longitudinal extension of the rotating transfer track (6), in which the rectilinear travel of the transfer elements (7, 7b) is increased so that they can be handled more easily. Said handling section ($1_M$) protrudes laterally from the machine (1) in order to be able to arrange around it the equipment and/or workstations necessary to conduct other operations or processes, such as assembly, filling, closing, etc., before releasing the objects (O).

The rotating transfer track is (6) of the carousel, transfer conveyor or conveyor belt type, which defines a closed oval-shaped path composed of two parallel straight segments joined by two arcs or semicircles. The axes of rotation ($6_Y$) pass through the center of said arcs or semicircles.

The rotating transfer track (6) is formed by a rotating conveyor belt (61) comprising:
 two semicircular sections ($61_C$) arranged around the two rotating axes ($6_Y$), each set to produce the rotary movement ($7\omega$) of the transfer elements (7, 7b); and
 two straight sections ($61_R$) attached to both semicircular sections ($61_C$) between the two rotating axes ($6_Y$), each set to produce the rectilinear movement ($7_T$) of the transfer elements (7, 7b).

The semicircular (61$_C$) and straight section (61$_R$) are joined together to form a closed circuit.

Figure 13:
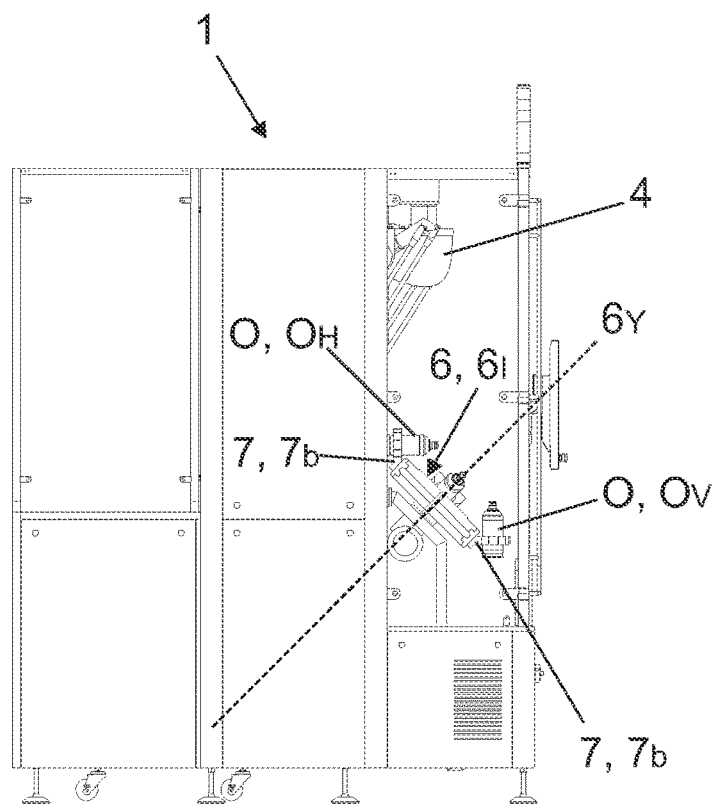
FIG. 13 depicts a profile view of the machine in FIG. 11.

As can be seen in FIG. 13, the rotating transfer track (6) is arranged in an inclined position (61), at about approx. 45° between the first conveyor belt (2) and the output means (5). In this case, the transfer elements (7, 7b) are set to receive the objects (O) coming from the robotic pick-up means (4) in a horizontal position (O$_H$) and deliver said objects (O) to the output mean (5) in a vertical position (O$_V$).

Figure 14:
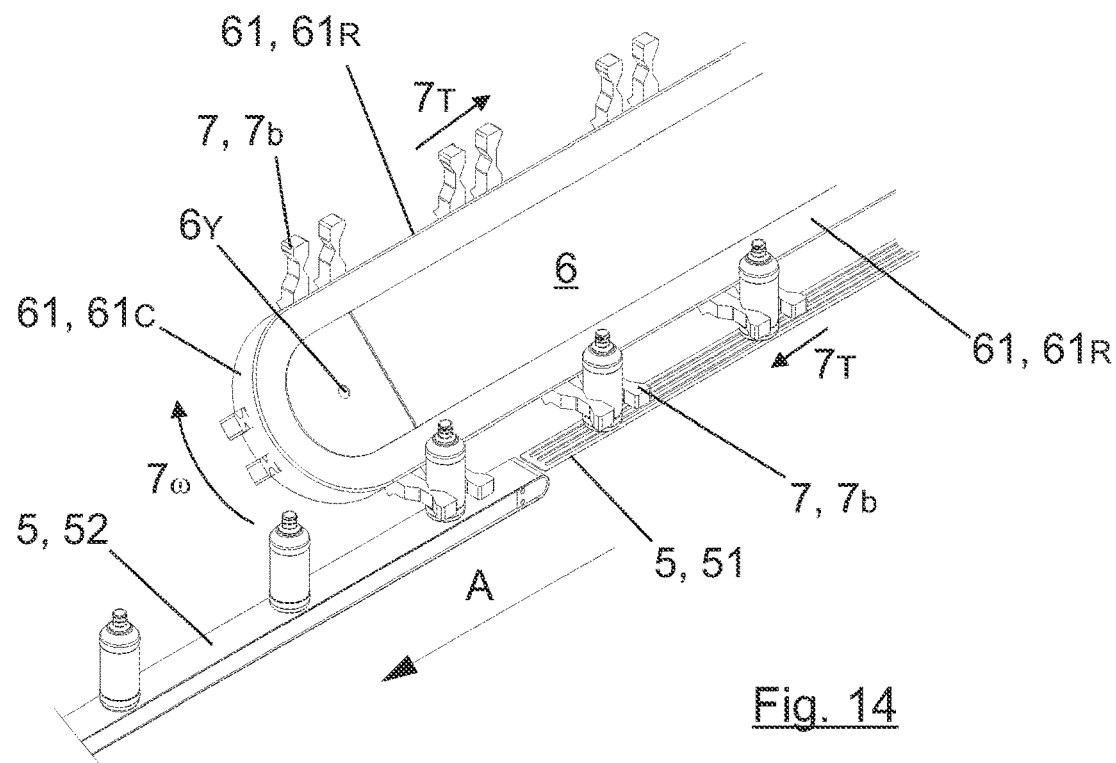
FIG. 14 depicts a detail view of one end of the rotating transfer track of the machine in FIG. 11.

FIG. 14 shows in more detail the arrangement of the transfer elements (7, 7b) in relation to the rotating transfer track (6). Specifically, said transfer elements (7, 7b) are attached to the rotatable transfer track (6), spaced equidistantly therebetween, or as appropriate, along the rotatable transfer track (6). The transfer elements (7, 7b) are therefore moved by the movement of the rotating transfer track (6) since they are attached thereto.

Each transfer element (7) is formed by a clamp (7b) set to hold the object (O). The gripper (7b) is set to close after receipt of the object (O) to clamp it, and to open during delivery (O) of said object to release it.

Figure 15:
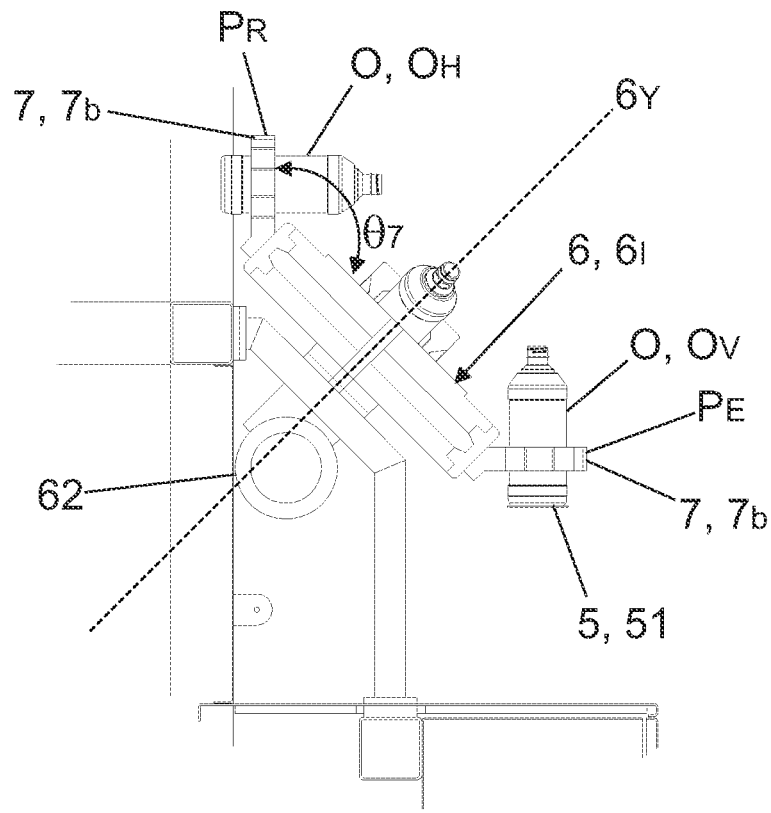
FIG. 15 depicts a partial sectional view according to cutline C-C of FIG. 12.

FIG. 15 shows a cross-section of the rotary transfer track (6) through one of its two rotating axes (6$_Y$), in this case, a transmitter rotation axis (6$_Y$) that receives the movement of a motor (62) and transmits it to the rotating conveyor belt (61) on which the transfer elements are attached (7, 7b).

The transfer elements (7, 7b) form an angle of inclination ($\theta_7$) with respect to the rotating transfer track (6) of 135°, being arranged vertically in a pick-up position (P$_R$), and horizontally in a delivery position (P$_E$).

Figure 16:
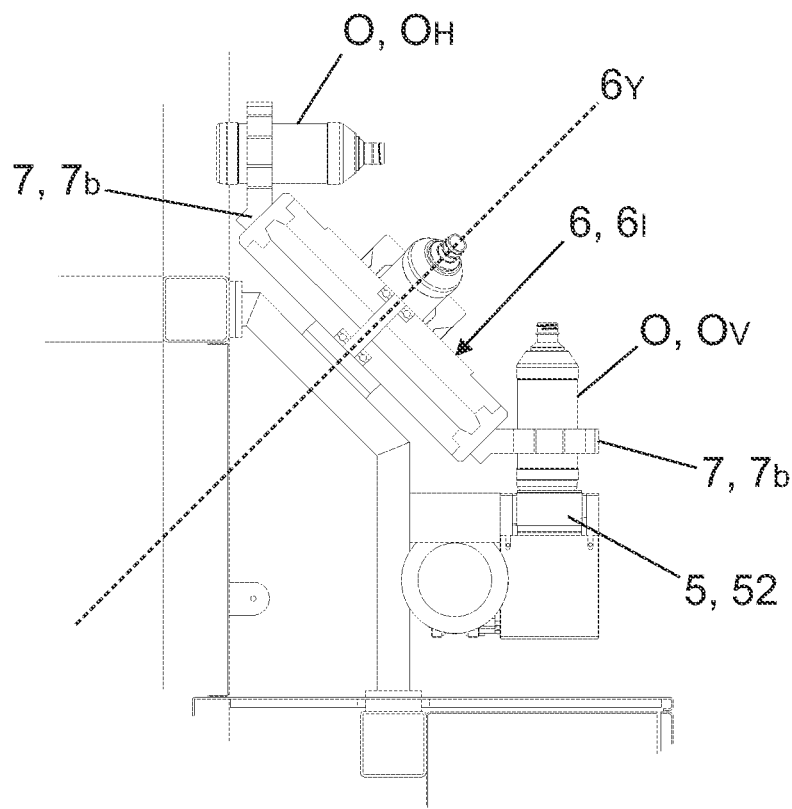
FIG. 16 depicts a partial sectional view according to cutline D-D of FIG. 12.

FIG. 16 shows a cross-section of the rotating transfer track (6) through the other of its two rotating axes (6$_Y$), in this case, a driven rotation axis (6$_Y$) that rotates freely dragged by the movement of the rotating conveyor belt (61).

Figure 17:
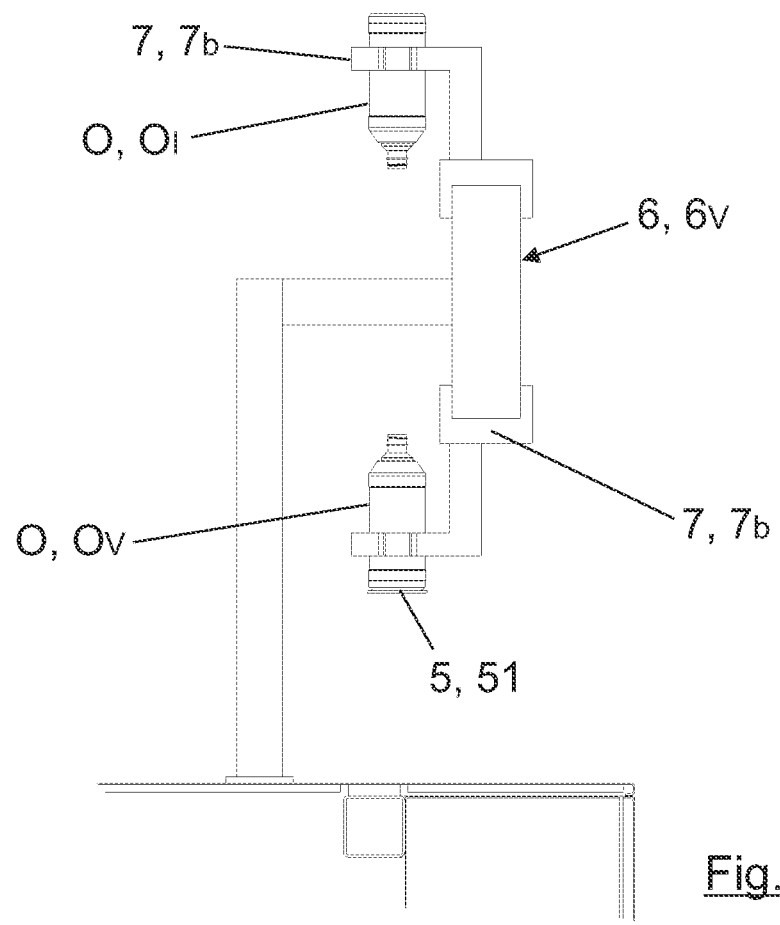
FIG. 17 depicts a partial profile view of a first embodiment of the machine of FIG. 11, in which the rotating transfer track is arranged vertically.

FIG. 17 shows a first embodiment of the machine of FIG. 11, in which the rotating transfer track (6) is arranged vertically (6$_V$) between the first conveyor belt (2) and the output means (5). In this case, the transfer elements (7, 7b) are set to receive the objects (O) coming from the robotic collection means (4) in inverted vertical position (O$_{IN}$) and deliver said objects (O) to the output means (5) in vertical position (O$_V$).

Figure 18:
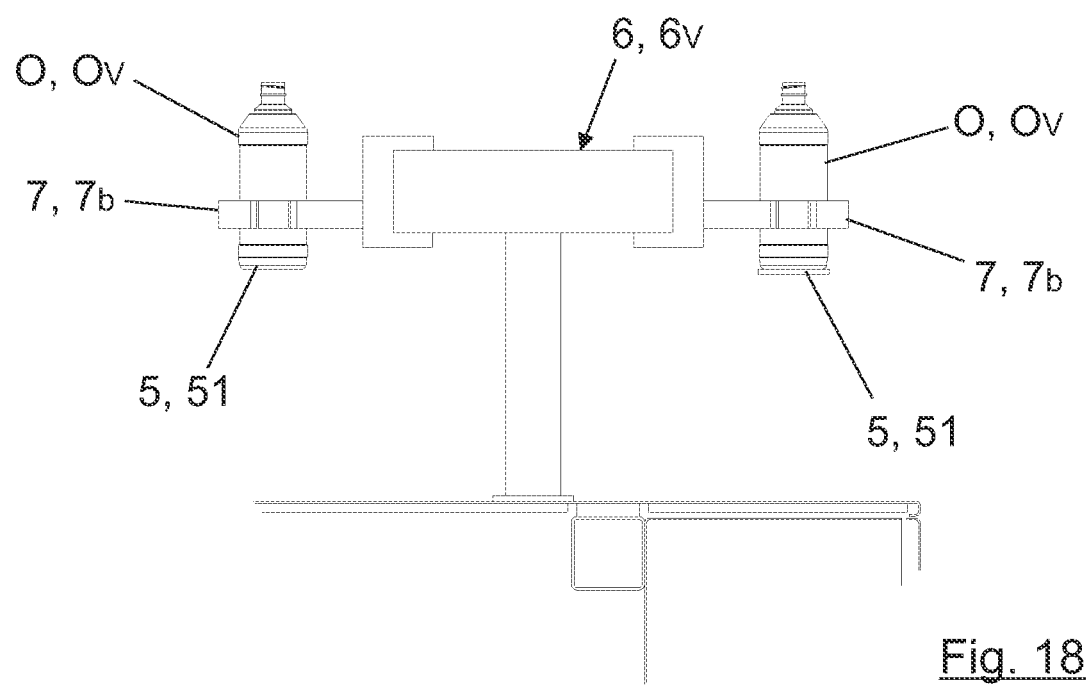
FIG. 18 depicts a partial profile view of a second embodiment of the machine of FIG. 11, in which the rotating transfer track is arranged horizontally.

FIG. 18 shows a second embodiment of the machine of FIG. 1, in which the rotating transfer track (6) is arranged horizontally (6$_H$) between the first conveyor belt (2) and the output means (5). In this case, the transfer elements (7, 7b) are set to receive the objects (O) coming from the robotic collection means (4) in a vertical position (O$_V$) and deliver said objects (O) to the output means (5) in a vertical position (O$_V$).

Figure 19:
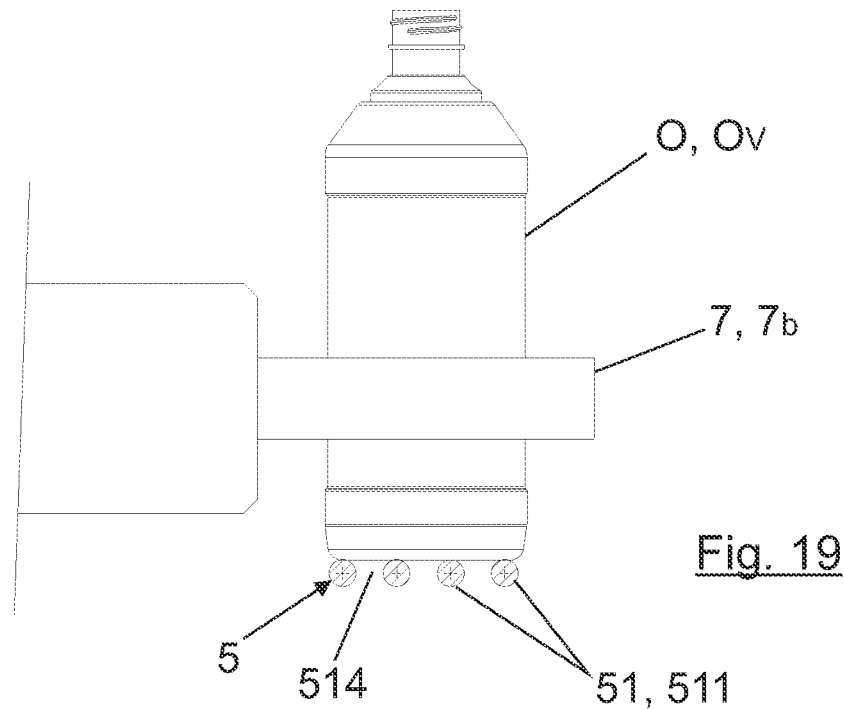
FIG. 19 depicts a cross-section of the handling track according to a first configuration thereof.

FIG. 19 shows a cross-section of the handling track (51) according to a first configuration thereof, wherein the latter is formed by a plurality of rods (511) having a smooth surface. Said rods (511) are arranged longitudinally in parallel as a guide, leaving free spaces (514) among them to reduce friction of the objects (O).

Figure 20:
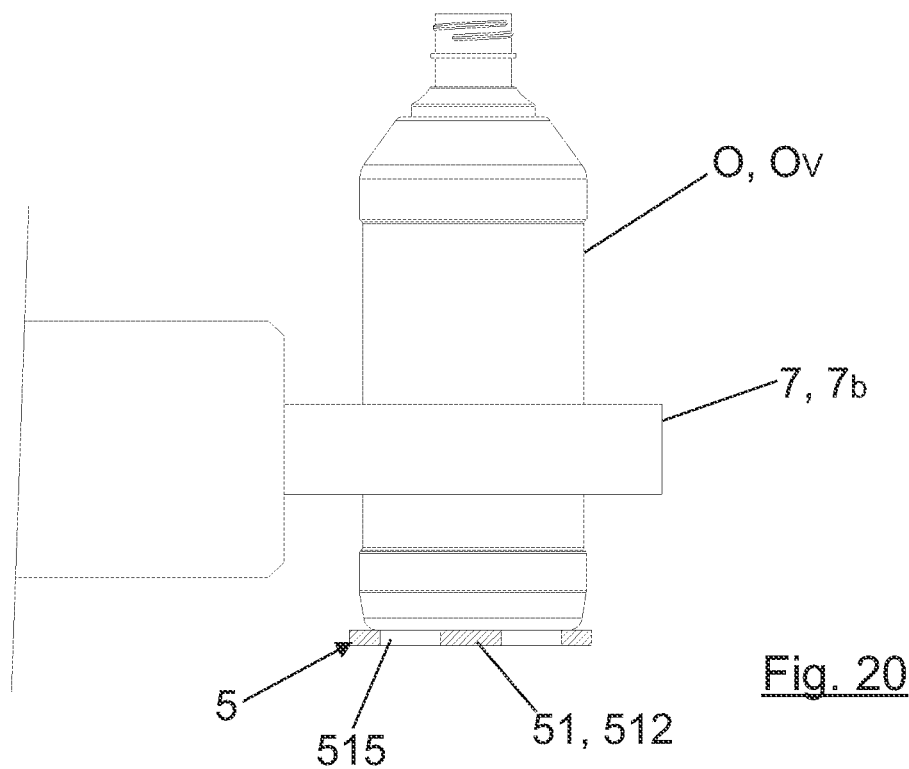
FIG. 20 depicts a cross-section of the handling track according to a second configuration thereof.

FIG. 20 shows a cross-section of the handling track (51) according to a second configuration thereof, wherein the latter is formed a plate or sheet (512). Said plate or sheet (512) is arranged longitudinally, comprising a grid-like pattern of holes and/or recesses (515) to reduce the friction of the objects (O).

Figure 21:
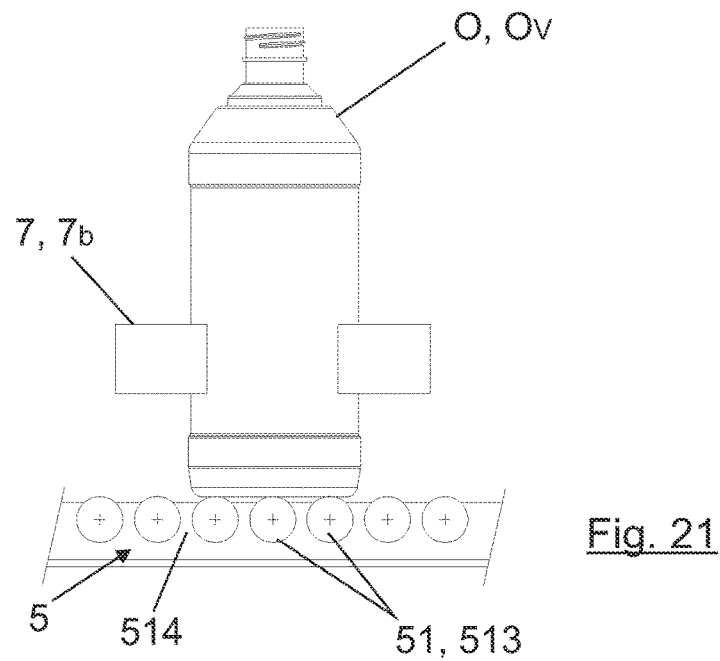
FIG. 21 depicts a cross-section of the handling track a third configuration thereof.

FIG. 21 shows a cross-section of the handling track (51) according to a third configuration thereof, wherein the latter is formed by a plurality of rotating rollers (513) arranged perpendicular to the direction of advance (A) of the objects (O), leaving free spaces (514) between them to reduce the friction of the objects (O). Said rollers (513) are set to rotate freely by the action of the objects (O) themselves contacting the rollers (513) to reduce friction.

Figure 22:
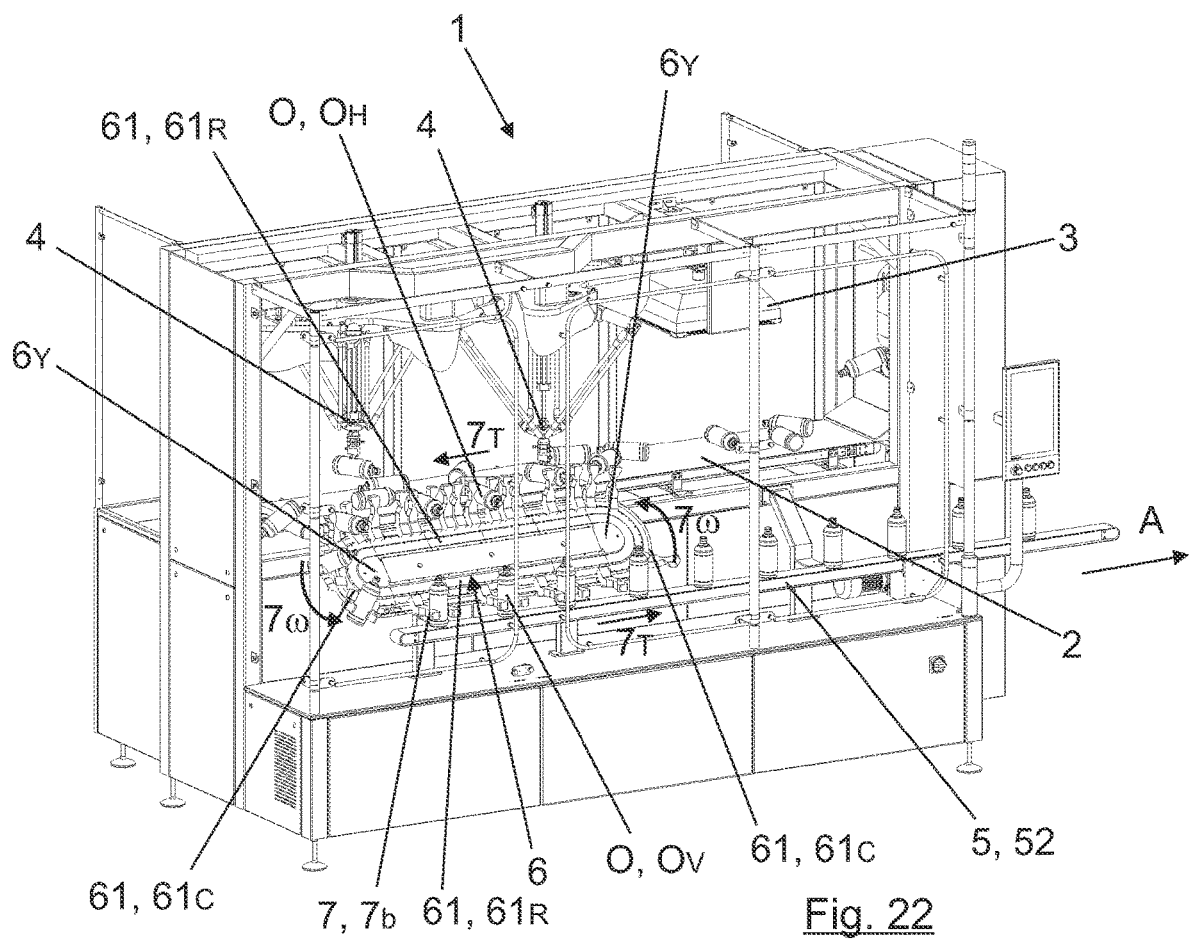
FIG. 22 depicts a general perspective view of the machine of this invention, according to a third preferred embodiment.

FIG. 22 depicts a general perspective view of the machine (1) of this invention, according to a third preferred embodiment. Said embodiment is similar to that of FIGS. 11 to 16, with the difference that the output means (5) only comprise a second motorized conveyor belt (52). That is, in this case, the machine does not have a handling track (51).

The invention claimed is:

1. Machine for positioning objects, comprising:
   a first conveyor belt set to receive a plurality of objects;
   machine vision means set to identify the position and shape of objects arranged on the first conveyor belt;
   robotic collection means set to pick up the objects from the first conveyor belt according to the information received from the machine vision means; and
   output means set to allow the output of said objects; said machine characterized in that it comprises:
   a rotating transfer track formed by a rotating conveyor belt and arranged in a closed circuit around rotating axes; and
   a plurality of transfer elements attached to the rotating transfer track along it, set to receive the objects coming from the robotic collection means and deliver said objects to the output means;
   where said rotating transfer track is set to produce a rotary movement of the transfer elements around the two rotating axes, and a rectilinear movement thereof between said two rotating axes.

2. Machine for positioning objects according to claim 1, characterized in that the output means comprise a handling track arranged longitudinally according to a direction of advance of the objects, set to allow support and sliding of the objects along the same.

3. Machine for positioning objects according to claim 2, characterized in that the handling track is arranged parallel to the first conveyor belt.

4. Machine for positioning objects according to claim 2, characterized in that the handling track is formed by a plurality of smooth-surfaced rods.

5. Machine for positioning objects according to claim 2, characterized in that the handling track is formed by a plate or sheet.

6. Machine for positioning objects according to claim 2, characterized in that the handling track is formed by a plurality of rotating rollers arranged perpendicular to the direction of advance of the objects.

7. Machine for positioning objects according to claim 1, characterized in that the output means comprises a second conveyor belt.

8. Machine for positioning objects according to claim 1, characterized in that the rotating conveyor belt comprises:
   two semicircular sections arranged around the two rotating axes, each set to produce the rotary movement of the transfer elements; and
   two straight sections attached to both semicircular sections between the two rotating axes, each set to produce the rectilinear movement of the transfer elements;
   where said semicircular sections and said straight sections are joined together forming a closed circuit.

9. Machine for positioning objects according to claim 1, characterized in that the rotating transfer track is arranged in an inclined position between the first conveyor belt and the output means.

10. Machine for positioning objects according to claim 9 characterized in that the transfer elements are set to receive objects coming from the robotic collection means in a horizontal position and deliver said objects to the output means in a vertical position.

11. Machine for positioning objects according to claim 1 characterized in that the rotating transfer track is arranged vertically between the first conveyor belt and the output means.

12. Machine for positioning objects according to claim 11 characterized in that the transfer elements are set to receive the objects coming from the robotic collection means in inverted vertical position and deliver said objects to the output means in vertical position.

13. Machine for positioning objects according to claim 1, characterized in that the rotating transfer track is arranged horizontally between the first conveyor belt and the output means.

14. Machine for positioning objects according to claim 13 characterized in that the transfer elements are set to receive objects coming from the robotic collection means in vertical position and deliver said objects to the output means in vertical position.

15. Machine for positioning objects according to claim 1, characterized in that the transfer elements are set to receive the objects coming from the robotic collection means in a predetermined position and deliver said objects to the output means in vertical position.

16. Machine for positioning objects according to claim 1, characterized in that the transfer elements are set to receive the objects by means of pneumatic suction or mechanical clamping.

17. Machine for positioning objects according to claim 1, characterized in that each transfer element comprises a gripper set to hold the object.

18. Machine for positioning objects according to claim 17, characterized in that the gripper is set to close after receipt of the object to hold the same, and to open during delivery of the object to release it.

19. Machine for positioning objects comprising:
a first conveyor belt set to receive a plurality of objects;
machine vision means set to identify the position and shape of objects arranged on the first conveyor belt;
robotic collection means set to pick up the objects from the first conveyor belt according to the information received from the machine vision means; and
output means set to allow the output of said objects; said machine characterized in that it comprises:
a rotating transfer track arranged in a closed circuit around rotating axes; and
a plurality of transfer elements attached to the rotating transfer track along it, set to receive the objects coming from the robotic collection means and deliver said objects to the output means; where said rotating transfer track is set to produce a rotary movement of the transfer elements around the two rotating axes, and a rectilinear movement thereof between said two rotating axes; characterized in that each transfer element is formed by a head comprising one or more suction cups set to hold the object by suction and/or aspiration thereof.

20. Machine for positioning objects according to claim 19, characterized in that it comprises at least two suction cups arranged perpendicular to the direction of advance of the objects.

21. Machine for positioning objects according to claim 19, characterized in that each suction cup is arranged on a movable base set to vary the position of the suction cup on the head.

22. Machine for positioning objects according to claim 19, characterized in that the output means comprise a handling track arranged longitudinally according to a direction of advance of the objects, set to allow support and sliding of the objects along the same.

* * * * *